July 7, 1925.

D. J. TOUSSAINT 1,545,370

COMBINATION CAP AND FLAG HOLDER

Filed Nov. 25, 1924

Daniel J. Toussaint
INVENTOR

BY Victor J. Evans
ATTORNEY

WITNESS

Patented July 7, 1925.

1,545,370

UNITED STATES PATENT OFFICE.

DANIEL J. TOUSSAINT, OF EAST ST. LOUIS, ILLINOIS.

COMBINATION CAP AND FLAG HOLDER.

Application filed November 25, 1924. Serial No. 752,234.

*To all whom it may concern:*

Be it known that I, DANIEL J. TOUSSAINT, a citizen of the United States, residing at East St. Louis, in the county of St. Clair and State of Illinois, have invented new and useful Improvements in Combination Cap and Flag Holders, of which the following is a specification.

My present invention has reference to caps for closing the water inlet spouts of automobile radiators, and my object is to provide such spouts with means for supporting flags or other ornaments thereon, and thus add to the attractiveness of the appearance of the cap.

A further object is the provision of a closure cap for the water inlet spouts of automobile radiators which is provided with oppositely extending arms terminating in ball heads which are bifurcated and which have revolubly received in the bifurcations thereof disks provided with openings for the staffs of small flags or the like, and wherein the pivot means for the disks sustain the said staffs therein, and likewise wherein the said pivots are in the nature of binding elements for permitting the disks to be arranged at desired angles with respect to the heads.

To the attainment of the foregoing, reference is to be had to the drawings which accompany and which form part of this application.

In the drawings:—

Figure 1:
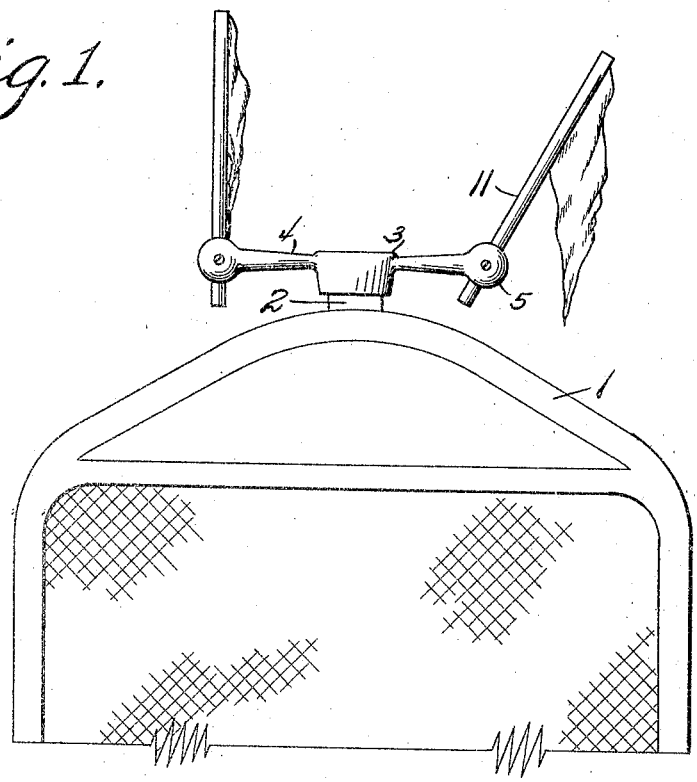
Figure 1 is a front elevation of an automobile illustrating the improvement thereon.
Figure 2:
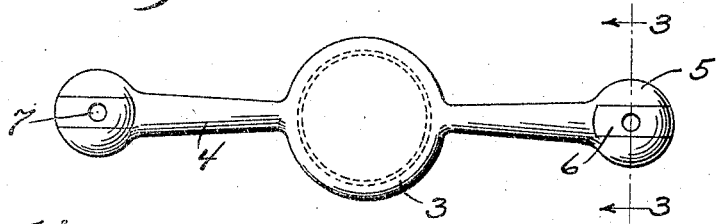
Figure 2 is a top plan view of the improvement.
Figure 3:
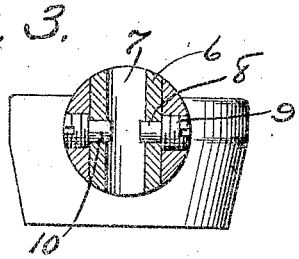
Figure 3 is a sectional view on the line 3—3 of Figure 2.

An automobile radiator is indicated by the numeral 1, in Figure 1 of the drawings. The spout for the radiator is indicated by the numeral 2, and the said spout is normally closed by a screw cap 3. The cap 3, in the present instance, is provided with oppositely extending arms 4. The arms are preferably round in cross section and are increased in size from their inner to their outer ends, the said outer ends terminating in ball heads 5. Each of the heads 5 is centrally bifurcated longitudinally, and in the slots thus provided there are arranged disks 6. The disks have their outer peripheries rounded transversely to conform to the peripheral contour of the ball heads 5. Each disk 6 is centrally provided with an opening 7, and the flat sides thereof are centrally provided with reduced aligning openings 8. Screwed in suitable openings in the sides of the heads 5 there are headless screws 9. The inner ends of these screws are provided with non-threaded projections 10 that are received through the openings 8. The openings 7 are designed to receive therethrough the staffs 11 of small flags or other ornamentations, and by adjusting the headless screws 9 the non-threaded ends 10 thereof will contact with the opposite sides of the staffs, effectively holding the same in the openings 7. The binding engagement between the headless screws and the sides of the disks 6 hold the said disks from accidental turning, but it will be apparent that the disks may be turned in the heads so that the staffs 11 may be arranged at desired angles.

Having described the invention, I claim:—

1. A closure cap for the spout of automobile radiators, having oppositely extending arms terminating in ball heads which are bifurcated, a disk in the bifurcated portion of each head having an opening therethrough for the reception of the staff of a small flag or like ornamentation, means pivotally sustaining the disks in the head, and said means also binding on the staffs for holding the same in the disks.

2. A cap for closing the water inlet spout of an automobile radiator having oppositely directed outwardly extending arms terminating in heads which are bifurcated, a disk received in each of the bifurcations and having an opening therethrough for the reception of the staff of a small flag or like ornamentation, headless screws threaded through the sides of the heads and having non-threaded extensions passing through the sides of the disks and engageable with the staffs for holding the latter in the disks.

In testimony whereof I affix my signature.

DANIEL J. TOUSSAINT.